July 1, 1958 N. A. MOERMAN 2,841,705

REVERSIBLE ELECTRONIC DECADE COUNTER

Filed May 29, 1953 2 Sheets-Sheet 1

INVENTOR.
NATHAN A. MOERMAN
BY
Alfred W. Barber
ATTORNEY

July 1, 1958 N. A. MOERMAN 2,841,705

REVERSIBLE ELECTRONIC DECADE COUNTER

Filed May 29, 1953 2 Sheets-Sheet 2

COUNTER STAGES

FORWARD COUNTING (ADDING)

| NO. PULSES | 1 | 2 | 4 | 8 |
|---|---|---|---|---|
| 0 | ○ | ○ | ○ | ○ |
| 1 | ⊗ | ○ | ○ | ○ |
| 2 | ○ | ⊗ | ○ | ○ |
| 3 | ⊗ | ⊗ | ○ | ○ |
| 4 | ○ | ○ | ⊗ | ○ |
| 5 | ⊗ | ○ | ⊗ | ○ |
| 6 | ○ | ⊗ | ⊗ | ○ |
| 7 | ⊗ | ⊗ | ⊗ | ○ |
| 8 | ○ | ○ | ○ | ⊗ |
| 9 | ⊗ | ○ | ○ | ⊗ |
| 0 | ○ | ○ | ○ | ○ |

FIG. 2.

REVERSE COUNTING (SUBTRACTING)

| NO. PULSES | 1 | 2 | 4 | 8 |
|---|---|---|---|---|
| 0 | ○ | ○ | ○ | ○ |
| 1 | ⊗/⊗ | ⊗/○ | ⊗/○ | ⊗/⊗ |
| 2 | ○ | ○ | ○ | ⊗ |
| 3 | ⊗ | ⊗ | ⊗ | ○ |
| 4 | ○ | ⊗ | ⊗ | ○ |
| 5 | ⊗ | ○ | ⊗ | ○ |
| 6 | ○ | ○ | ⊗ | ○ |
| 7 | ⊗ | ⊗ | ○ | ○ |
| 8 | ○ | ⊗ | ○ | ○ |
| 9 | ⊗ | ○ | ○ | ○ |
| 0 | ○ | ○ | ○ | ○ |

FIG. 3.

*INVENTOR.*
NATHAN A. MOERMAN
*BY* Alfred W. Barber
*ATTORNEY*

United States Patent Office 2,841,705
Patented July 1, 1958

2,841,705

REVERSIBLE ELECTRONIC DECADE COUNTER

Nathan A. Moerman, Roslyn, N. Y.

Application May 29, 1953, Serial No. 358,327

1 Claim. (Cl. 250—27)

The present invention concerns electronic counters and, in particular, electronic counters which operate either in the forward direction to add or in the reverse direction to subtract.

In U. S. Patent No. 2,538,122, issued on Jan. 16, 1951, there is shown and described an electronic counter suitable for rapid counting in the forward direction. This counter comprises four dual tube trigger stages each capable of counting two making a total count of sixteen for the four stages. The patent also shows count modifying interconnections for producing a scale of ten count. One method of transforming a scale of sixteen counter to a scale of ten counter, as shown in the patent, is to provide two coupling paths one of which resets the fourth stage and the other of which prevents the second stage from going to the "on" condition at the tenth count. Just prior to the tenth count, stages one and four are "on" so that with the addition of the two coupling paths, all stages will be "off" i. e. reset to zero by the tenth pulse.

In order to count in the reverse direction, i. e. to subtract rather than add a quite different problem exists. Each input pulse subtracts a count of one from the total count. Basically this is accomplished by coupling the opposite side of each binary stage from the side used in adding to the following stage. This causes the following stage to reverse when a given stage goes on rather than when it goes off as in adding. This operation will be explained in detail in connection with the drawings. One further step is necessary since the first input pulse must provide a count of nine rather than a count of fifteen which would occur without a modified circuit. At the start the count is zero and all four stages are off. The first input pulse turns the first stage on and since the turning on of a stage turns the second stage on, the second the third and the third the fourth. At this point the counter shows a count of fifteen, i. e. sixteen minus one. Hence, in order to register nine as it should (ten minus one) a count of six must be read out at this point. This is accomplished by resetting the 2 and 4 stages thereby subtracting 6 and resulting in the desired count of nine. At this count of nine the 1 and 8 stages are on and the next pulse turns stage 1 off leaving a count of 8. The process as set forth in details in connection with the figures of the drawing continues until on the tenth pulse all stages are off and a count of zero is again reached and the counter is ready to repeat.

One important feature of the invention is the special coupling circuit used between the binary stages which permits a control signal to initiate counting in either direction at will.

One object of the present invention is to provide a method of and means for operating an electronic counter in either direction, forward to add and in reverse to subtract.

Another object is to provide a simple and reliable electronic counter which may be operated to count according to the decimal system and in either direction.

Still another object is to provide a simple and efficient interstage coupling circuit in an electronic counter which is readily controlled by means of a control voltage to pass pulses or not to pass pulses.

A further object is to provide a decimal electronic counter which subtracts a count of one from the total count for each input pulse.

A still further object is to provide an electronic counter which may be operated to count either forward or in reverse and may be changed from the forward mode to the reverse mode by means of a double pole double throw switch.

These and other objects will be apparent from the detailed description of the invention given in connection with the various figures of the drawing:

In the drawing:

Fig. 2 shows a diagram illustrating the operation of the counter when adding.

Fig. 3 shows a diagram illustrating the operation of the counter when subtracting.

Figure 1:
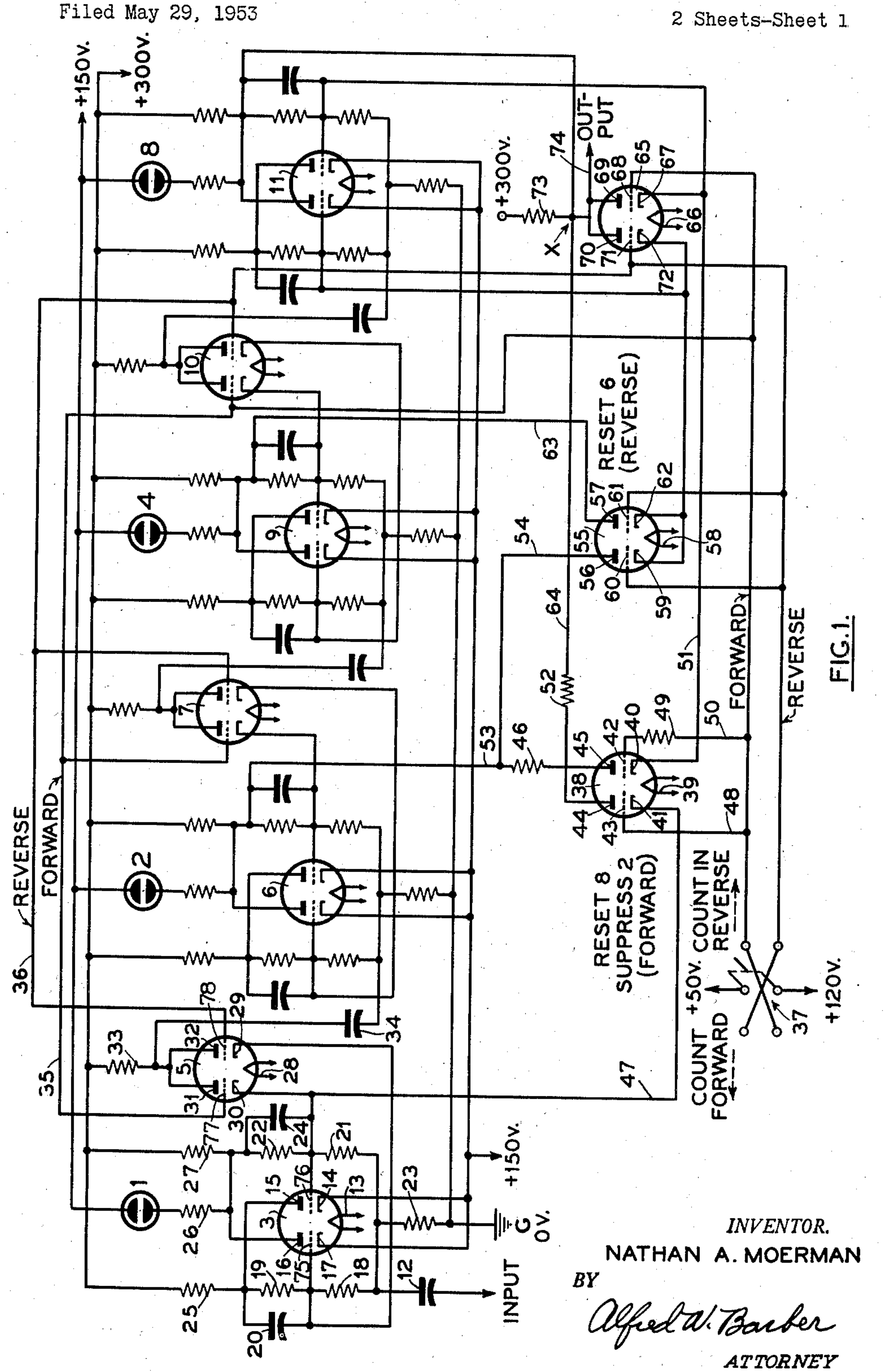
Fig. 1 shows a schematic circuit diagram of the preferred form of the present invention.

Fig. 1 shows a circuit for counting either forward or reverse including the four binary trigger pairs 3, 6, 9 and 11. The stages 6, 9 and 11 are similar to 3 in which input pulses are applied to grids 75 and 76 through resistors 18 and 21 respectively and across common resistor 23. Grid 75 is associated with plate 16 and cathode 17 while grid 76 is associated with plate 15 and cathode 14. Cathodes 14 and 17 are connected to a bias source of plus 150 volts. Plate 15 is connected to a source of plate voltage of plus 300 volts through load resistor 25 and is cross-connected to grid 75 through resistor 19 by-passed by capacitor 20. Plate 16 is connected through load resistor 27 to the plus 300 volt source and is cross-connected through resistor 22 by-passed by capacitor 24 to grid 76. With the above circuit, trigger 3 shifts its "on" condition from one side to the other in response to input pulses as is well known in the art. Neon lamp 1 connected to plate 16 through current limiting resistor 26 indicates when the stage is "on," i. e. when plate 15 is conducting and plate 16 is non-conducting.

The binary stages are coupled by means of coupling tubes, 5, 7 and 10. Tube 5 couples binary stage 3 to binary stage 6, tube 7 couples binary stage 6 to binary stage 9 and tube 10 couples binary stage 9 to binary stage 11. Each of these coupling tubes comprises a double triode connected in such a way that one triode transmits pulses to the following binary stage from one side of the preceding binary stage and the other triode transmits pulses from the other side of the preceding binary stage. The triode to be utilized is selected by means of a control voltage applied to its grid. The triode, which is connected so as to transmit a pulse to the following binary stage when the "on" side of the binary stage goes "off," is energized for counting in the forward direction. The other triode is connected to transmit a pulse when the binary stage goes from "off" to "on" for counting in the reverse direction.

In Fig. 1 coupling tube 5 includes one triode section comprising cathode 30, control grid 77 and plate 31 while the other triode section comprises cathode 29, control grid 78 and plate 32 and heater 28 supplying both cathodes. Cathode 30 is connected to grid 76, the output side of the first trigger stage. The two plates 31 and 32 are connected together and through coupling capacitor 34 to the grids of the trigger stage 6 so that pulses appearing at these plates will trigger stage 6. Grid 77 together with the corresponding grids of coupling stages 7 and 10 are connected to switch 37 so that when switch 37 is thrown in the direction marked "Count Forward," a bias of plus 50 volts is applied to these grids. With plus 50 volts on grid 77, triode 30—31—77 is activated and the pulse appearing at grid 76 when stage 3 goes "off" is passed on to the next stage 6. This corresponds to the normal forward counting of a conventional binary counter of several stages.

Fig. 2 shows the "on/off" conditions of the trigger stages for counting from 1 to 10. The open circles represent trigger "off" conditions, that is, the condition in which the second section of each trigger pair is conducting. The circles with the X in the center represent trigger "on" conditions, that is, the condition in which the first section of the trigger pair is conducting. It will be seen from this chart that initially on a count of zero that all four stages are "off." On a count of one the first stage is turned on. On a count of two the first stage is off and the second stage is turned on. This process continues until a count of nine is reached. On the next or tenth count auxiliary circuits turn off the fourth stage and prevent the second stage from going on so that the counter returns to zero. This turning off of stage 4 and holding off of stage 2 may be accomplished in any suitable manner as, for instance, by the use of control tube 38 as shown in Fig. 1. Control tube 38 includes two sets of triode elements, cathode 41, grid 43 and plate 44 forming one set and cathode 40, grid 42 and plate 45 forming the other set with common heater 39. When switch 37 is thrown to the "Count Forward" side, a positive bias of 120 volts is placed on grid 43 and through decoupling resistor 49 on grid 42. This activates tube 38 so that a pulse from grid 76 applied over lead 47 to cathode 41 passes to plate 44, through resistor 52 and over lead 64 to trigger 11 where it turns this trigger "off." The pulse generated when trigger 11 goes "off" is applied over lead 51 to cathode 40. Since tube 38 is activated, this pulse is passed to plate 45 and through resistor 46 over lead 53 to trigger 6 where it prevents this trigger from turning "on." Thus, on the tenth pulse, all triggers return to "off" condition. The plus 120 volt bias applied to the "forward" control lead by switch 37 is applied to grid 68 of output control tube so that the pulse on lead 51 when applied to cathode 67 is coupled out through plate 69 and over output lead 74. Thus has been described the operation of the system for forward counting or adding.

To cause the system to operate in reverse or to subtract, switch 37 is thrown to the side designated "Count in Reverse." When in this position, switch 37 applies plus 120 volts on the lead marked "Reverse." The double triode 55 is activated by this plus 120 volt bias on its grids 60 and 61. The double triode 55 includes cathodes 59 and 62 heated by heater 58 and associated with grid 60 and plate 56 and grid 61 and plate 57 respectively. The function of tube 55 is to turn stages 6 and 9 off in response to the first pulse as will be set forth further below.

In order to count in reverse, i. e. subtract, triode 29—78—32 of tube 5 and the corresponding triodes of tubes 7 and 10 are activated by the plus 120 volt bias through switch 37 over lead 36 to grid 78, etc. The reverse counting triode operates and is connected so that when the trigger feeding it goes "on" a pulse is fed forward to the next trigger turning it on. Cathode 29 is connected to grid 75 at which point a pulse is generated when trigger stage 3 goes "on" in response to an input pulse. The pulse on cathode 29 is relayed through plate 32 and hence through coupling capacitor 34 to the input of trigger stage 6 turning it "on." In like manner when stage 6 goes "on" coupling tube 7 turns on trigger stage 9 and when stage 9 goes "on," coupling tube 10 turns on trigger stage 11. Cathodes 59 and 62 of reset tube 6 are connected to stage 11 at a point where a pulse is generated when this stage goes "on" and may be the point corresponding to the points from which coupling tubes 5, 7 and 10 receive pulses from stages 3, 6 and 9. This pulse is relayed by both plates 56 and 57 since tube 55 is activated and from plate 56 the relayed pulse goes over lead 54 to stage 6 to turn it "off" and from plate 57 over lead 63 to stage 9 to turn it "off."

Fig. 3 shows in tabular form the on/off conditions of the various trigger stages at various count points. At the start (count 0) all stages are "off." The first pulse turns the first stage "on" and, as described above, this turns "on" the second stage, and the second turns on the third and the third turns on the fourth, but control tube 55 receiving a pulse from the fourth stage when it goes "on" turns off the second and third stages so that only stages one and four remain on showing a count of 8 plus 1 or 9. The next pulse turns the first stage off leaving a count of 8 showing. The next pulse turns on stages 1, 2 and 3 and turns off stage 4 leaving a count of 1 plus 2 plus 4 or 7. The next pulse turns stage 1 off leaving a count of 6. The fifth pulse turns stage 1 on which in turn turns stage 2 off (since when and only when a stage goes on the following stage is reversed). The next pulse turns stage 1 off leaving a count of 4. The next pulse turns stage 1 on which in going on turns stage 2 on which in going on turns stage 3 off yielding a count of 3. The next pulse turns stage 1 off. The next pulse turns stage 1 on which in turn turns stage 2 off leaving a count of 1. The tenth pulse turns stage 1 off and the triggers are all back at off as their final condition. Thus, the counter has counted in reverse starting with 10 down to zero subtracting a count of one for each input pulse.

While only one form of the present invention has been shown and described many modifications will be apparent to those skilled in the art and within the spirit and scope of the invention as set forth in the appended claim.

What is claimed is:

In an electronic counter for counting forward for one mode of operation and for counting in reverse for another mode of operation, the combination of, four bi-stable binary counting thermionic triode vacuum tube trigger stages each capable of assuming alternate "on" and "off" conditions in response to applied pulses, thermionic triode vacuum tube couplings connected between the first and second, the second and third and the third and fourth stages for reversing a given stage in response to the going "off" of the stage preceding said given stage for counting in a forward direction, a thermionic triode vacuum tube for resetting the fourth stage and for preventing the second stage from reversing upon application of an input pulse when the first and fourth stages are "on" for converting from binary to decimal counting in counting in the forward direction, additional thermionic triode vacuum tube couplings connected between the first and second, the second and third and the third and fourth stages for reversing a given stage in response to the going "on" of the stage preceding said given stage for counting in the reverse direction, and a thermionic triode vacuum tube for resetting the second and third stages upon application of an input pulse when all the stages are "on" for converting from binary to decimal counting in the reverse counting direction.

References Cited in the file of this patent

UNITED STATES PATENTS

| | | |
|---|---|---|
| 2,462,275 | Morton et al. | Feb. 22, 1949 |
| 2,536,917 | Dickenson | Jan. 2, 1951 |
| 2,557,186 | Hamacher | June 19, 1951 |
| 2,562,591 | Wagner et al. | July 31, 1951 |
| 2,566,918 | Bergfors | Sept. 4, 1951 |
| 2,583,102 | Holden | Jan. 22, 1952 |